United States Patent [19]
Bruckelmyer

[11] Patent Number: 5,449,113
[45] Date of Patent: Sep. 12, 1995

[54] PROBE FOR CIRCULATING HEATED WATER

[76] Inventor: Mark Bruckelmyer, 5617 McQuade Rd., Duluth, Minn. 55804

[21] Appl. No.: 262,600

[22] Filed: Jun. 20, 1994

[51] Int. Cl.[6] .................................................. E03B 7/14
[52] U.S. Cl. .................................. 237/1 R; 285/133.1; 405/131
[58] Field of Search ............................. 285/132, 133.1; 405/130, 131; 237/1 R; 62/260; 165/45, 142

[56] References Cited

U.S. PATENT DOCUMENTS

| | | | |
|---|---|---|---|
| 340,161 | 4/1886 | Sooysmith. | |
| 879,745 | 2/1908 | Cooper. | |
| 1,326,078 | 12/1919 | Matthews | 285/133.1 |
| 1,390,457 | 9/1921 | Moran. | |
| 1,587,984 | 6/1926 | Pearce. | |
| 1,704,577 | 3/1929 | Pomykala. | |
| 2,239,685 | 4/1941 | Noack | 165/45 X |
| 2,754,137 | 7/1956 | Gine et al. | 285/133.1 X |
| 3,293,863 | 9/1963 | Cox et al. | 61/36 |
| 3,299,643 | 1/1967 | Mauclet | 405/130 |
| 3,482,626 | 12/1969 | Gainsboro et al. | 285/133.1 X |
| 3,699,685 | 10/1972 | Scott | 61/36 A |
| 3,762,171 | 10/1973 | Bjorheim et al. | 61/36 A |
| 3,792,187 | 2/1974 | Depcrymsksi | 285/133.1 X |
| 4,094,151 | 6/1978 | Fujita et al. | 61/36 A |
| 4,512,156 | 4/1985 | Nagase | 165/45 X |
| 4,676,695 | 6/1987 | Duthweiler | 405/157 |
| 4,986,311 | 1/1991 | Mikkelson | 138/35 |
| 5,181,655 | 1/1993 | Bruckelmyer | 237/1 R |

FOREIGN PATENT DOCUMENTS 716771 10/1954 United Kingdom ................ 285/132

*Primary Examiner*—William E. Tapolcai
*Attorney, Agent, or Firm*—Palmatier, Sjoquist & Helget

[57] ABSTRACT

The probe for circulating heated water for thawing frozen ground is a portion of a mobile heating system including a plurality of hose sections. The probe includes a T-connection having a fluid inlet section, a first fluid outlet section, and a second fluid outlet section. An elongate outer tube having an ingress port is affixed to the first fluid outlet section. The elongate outer tube includes a closed penetrating end for insertion into a frozen ground surface. An inner tube is positioned inside the T-connection and the outer tube. The inner tube has an inflow end positioned proximate to the closed penetrating end and an elbow having an outflow opening positioned within the T-connection where the outflow opening is positioned proximate to the second fluid outlet section. The probe defines a perpendicular fluid-flow course which depends downwardly between the outer tube and the inner tube for entry into the inner tube proximate to the penetrating end. The perpendicular fluid-flow course then extends vertically upward through the inner tube for exit from the outflow opening and T-connection proximal to the second fluid outlet section.

18 Claims, 2 Drawing Sheets

PROBE FOR CIRCULATING HEATED WATER

BACKGROUND OF THE INVENTION

A probe for circulating heated water for thawing frozen ground is used in connection with a mobile heating system which is disclosed by co-owned U.S. Pat. No. 5,181,655. The mobile heating system includes a hot water heater, antifreeze reservoir, and pumps mounted on a mobile apparatus such as a trailer for towing by a car or truck. A line is connectable to the heater and antifreeze reservoir and includes a plurality of elongate heater probes for being implanted in the ground adjacent to a frozen water or sewer line. Circulation of hot water through the line and probes thaw the ground. Alternatively, the probes may be used to heat building materials such as bricks.

The mobile heating system which is uniquely adapted for use at construction sites and/or for various ground-thawing purposes is most suitably applied in northern climates. In the northern climates there are a great many uses for a portable or mobile heating system, particularly in the construction industry but also in the maintenance and correction of ground-freezing problems relating to pre-existing structures. A common problem in the northern climate is the problem of frozen underground water and/or sewer pipes. This problem is caused by a combination of factors; in some cases the underground pipes are laid too close to the surface, and in other cases a severe cold spell without adequate snow cover causes ground freezing to an unexpected depth. One general type of solution to this problem is to obtain access into the pipe and/or conduit which is frozen and inject heated liquid into the conduit until the frozen portion becomes dislodged of ice. Another general type of approach that has been used, particularly in the case of metal underground pipes, is to apply a very high electrical current to the metal pipe casing thereby heating it to a temperature which causes the interior to become thawed. A third general type of solution to this problem has been to insert heating pipes into the ground itself and thaw the ground surrounding the pipe thereby thawing the interior of the pipe. A fourth approach is to do nothing and suffer through the inconvenience of lost utilities until the inclement weather has passed. The present invention is directed to the third type of solution, at least with respect to the problem of thawing frozen underground pipes.

A further problem exists in connection with outdoor construction projects in cold climates. For example, construction work such as brick laying is severely hampered in cold weather, not only because the concrete tends to be difficult to maintain in usable form, but also because the sand mixtures and the bricks themselves tend to become frozen. The optimum temperature for laying brick or block materials is in the range of 40° to 45° F. If the temperature drops below this range, the mortar used to bond the bricks and/or blocks will not properly adhere to the materials leading to a weakened structure. In such situations it would be helpful to elevate the temperature of such construction materials so as to improve the overall quality and efficiency of the finished construction project. The present invention is also useful on construction projects for heating construction materials in preparation for use.

In the past a problem has arisen concerning circulation of heated fluid in the vicinity of the closed penetrating end of the probe. Various mechanical solutions have been implemented to improve fluid circulation within a probe, including the use of a perforated inner tube. The use of a perforated inner tube, and/or other complicated mechanical solutions to improve heated fluid flow within a probe, significantly increases the expense of the mobile heating system.

SUMMARY OF THE INVENTION

The probe for circulating heated water for thawing frozen ground is a portion of a mobile heating system including a plurality of hose sections. The probe includes a T-connection having a fluid inlet section, a first fluid outlet section, and a second fluid outlet section. An elongate outer tube having an ingress port is affixed to the first fluid outlet section. The elongate outer tube includes a closed penetrating end for insertion into a frozen ground surface. An inner tube is positioned inside the T-connection and the outer tube. The inner tube has an inflow end positioned proximate to the closed penetrating end and an elbow having an outflow opening positioned within the T-connection, where the outflow opening is positioned proximate to the second fluid outlet section. The probe defines a perpendicular fluid-flow course which depends downwardly between the outer tube and the inner tube for entry into the inner tube proximate to the penetrating end. The perpendicular fluid-flow course then extends vertically upward through the inner tube for exit from the outflow opening and T-connection proximal to the second fluid outlet section.

It is a principal object of the present invention to provide a new and improved probe for use in a mobile heating system of relatively simple and inexpensive design, construction, and operation which is safe and durable and which fulfills the intended purpose of thawing frozen ground in the vicinity of frozen pipes or conduits without fear of injury to persons and/or damage to property.

It is a principal object of the present invention to provide a simplified probe formed of cost-effective components which facilitate heated fluid circulation for the thawing of frozen ground and frozen pipes or conduits.

A feature of the present invention is a T-connection having a fluid inlet section, a first fluid outlet section, and a second fluid outlet section.

Another feature of the present invention is an elongate outer tube having an ingress port attached to the first fluid outlet section and a closed penetrating end for insertion into a frozen ground surface.

Still another feature of the present invention is an inner tube positioned inside the outer tube and T-connection.

Still another feature of the present invention is an inner tube including an inflow end position proximate to the penetrating end and an elbow having an outflow opening positioned within the T-connection where the outflow opening is positioned adjacent to the second fluid outlet section.

Still another feature of the present invention is a means for positioning which functions to releasably hold the outflow opening centrally within the second fluid outlet section and the inner tube centrally within the outer tube.

Still another feature of the present invention is a perpendicular fluid-flow course for the heated fluid which initially depends from the T-connection downwardly between the outer tube and the inner tube for entry into the inflow end for vertical passage within the inner tube and exit from the outflow opening.

Still another feature of the present invention is the positioning of the elbow within the T-connection where the outflow opening is adjacent to the second fluid outlet section.

Still another feature of the present invention is the inner tube which is slightly smaller than the diameter of the inner tube which, in turn restricts a longitudinal fluid-flow course which extends between the fluid inlet section and the second fluid outlet section of the T-connection.

DETAILED SPECIFICATION OF THE PREFERRED EMBODIMENT

Figure 1:
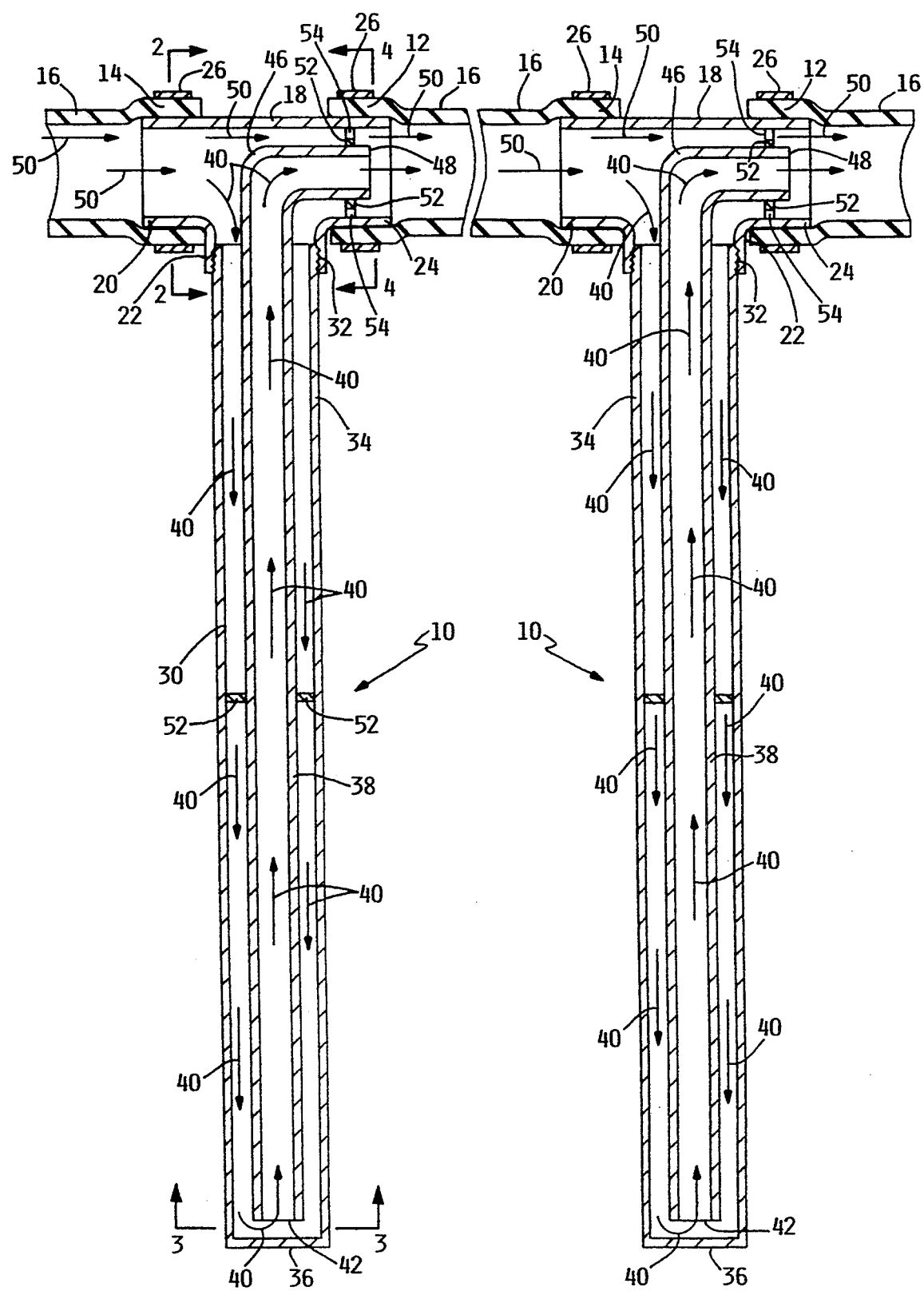
FIG. 1 is a cross-sectional side view of the probe.
Figure 2:
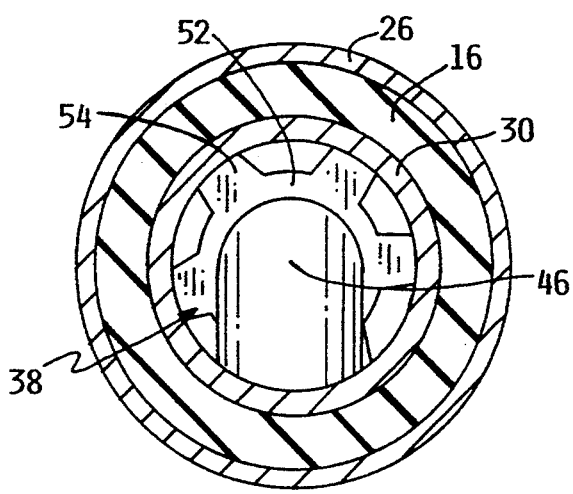
FIG. 2 is a cross-sectional view taken along line 2—2 of FIG. 1.
Figure 3:
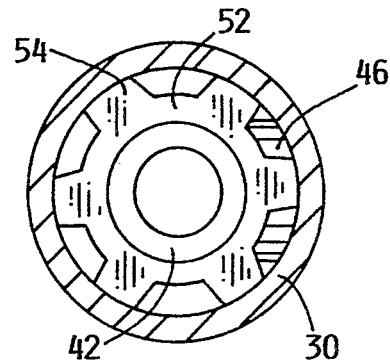
FIG. 3 is a cross-sectional bottom view taken along line 3—3 of FIG. 1.
Figure 4:
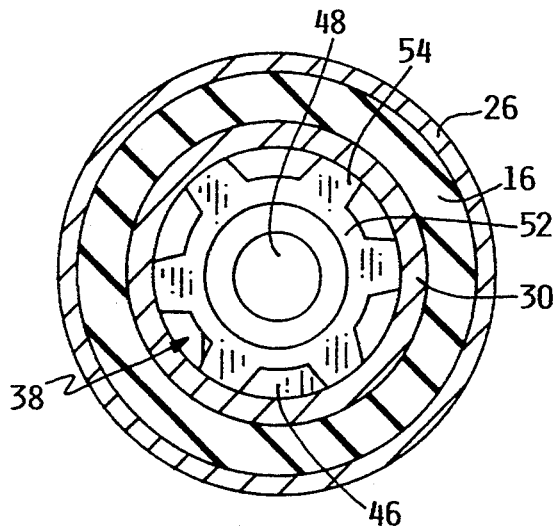
FIG. 4 is a cross-sectional view taken along line 4—4 of FIG. 1.

One form of the invention is illustrated and described herein. In general, the probe for circulating heated water is indicated by the numeral 10. The probe 10 is preferably elongate and is used for circulation of heated fluids from a heater connected to a mobile heating system. The elongate probes 10 are generally used for insertion into frozen ground for thawing an area proximate to a frozen sewer or water line. The elongate probes 10 are in fluid communication with a hot water heater and the respective inlet connectors 12 and outlet connectors 14 of a plurality of hose sections 16.

A plurality of elongate probes 10 are preferably connected in series during the thawing of a frozen ground area during the warming of a frozen sewer or water line. The heated fluid contained within the plurality of hose sections 16 and elongate probes 10 may be either water or antifreeze as preferred by an individual.

Each elongate probe 10 preferably includes a T-connection 18. Each T-connection 18 preferably includes a fluid inlet section 20, a first fluid outlet section 22, and a second fluid outlet section 24. The fluid inlet section 20 is preferably connected to an outlet connector 14 of a hose section 16 by a clamp 26. The second fluid outlet section 24 is preferably connected to an inlet connector 12 of a hose section 16 by another clamp 26. Alternatively, the exterior surface of the fluid inlet section 20 and the second fluid outlet section 24 may be threaded for receiving engagement of threaded inlet connectors 12 and outlet connectors 14.

A plurality of T-connections 18 may be connected to any desired number of medial hose sections 16 which are disposed between adjacent elongate probes 10. Each of the fluid inlet sections 20 and second fluid outlet sections 24 may include sealing ribs for pinching the inlet connectors 12 and outlet connectors 14 in cooperation with the clamps 26 for sealing of the heated fluid or antifreeze within the elongate probes 10.

An outer tube 30 is preferably affixed to and depends from the first fluid outlet section 22. The outer tube 30 is preferably connected to the exterior surface of the first fluid outlet section 22 by threaded mating surfaces 32. Each of the threaded mating surfaces 32 is positioned proximate to the T-connection 18 permitting and facilitating the insertion of the elbow 46.

Each elongate outer tube 30 includes an ingress port 34 and a closed penetrating end 36. The elongate outer tube 30 is preferably formed of steel tubular material of sufficient strength and durability for forcible penetration into a frozen ground surface. The closed penetrating end 36 of the outer tube 30 may be sealed with a plug or alternatively may be sealed by the tapering and closure of the outer tube 30 into a point.

The inner tube 38 preferably includes an inflow end 42, an elbow 46, and an outflow opening 48. The inner tube 38 is preferably positioned within the outer tube 30, the T-connection 18, and the second fluid outlet section 24. During assembly, the outflow opening 48 of the inner tube 38 is preferably inserted into the first fluid outlet section 22 and is rotated upwardly and laterally for positioning adjacent to the second fluid outlet section 24. The outer diameter dimension for the inner tube 38 is smaller than the inner diameter dimension for the outer tube 30.

The inflow end 42 is preferably positioned proximate to the closed penetrating end 36 of the outer tube 30. The outflow opening 48 of the inner tube 38 is preferably positioned proximate to the second fluid outlet section 24 of the T-connection 18. The elbow 46 is preferably positioned within the T-connection 18 approximately equal distance between the fluid inlet section 20 and the second fluid outlet section 24. The diameter dimension for the elbow 46 is preferably smaller than the interior dimensional size for the T-connection 18. The outer diameter dimension for the outflow opening 48 is preferably smaller than the inner diameter dimension for the second fluid outlet section 24.

In the simplest embodiment of the invention, the inner tube 38 with its elbow 46 and outflow opening 48 may be inserted into outer tube 30 and partially through T-connection 18, and may be freely suspended therein. The respective diameters of the inner tube 38 and the inside diameter of the outer tube 30 should be selected to permit sufficient clearance for liquid flow therebetween, but it is not necessary that inner tube 38 be precisely concentrically positioned inside of tube 30.

A means for positioning 52 may be engaged to the interior of the outer tube 30, the exterior of the inner tube 38, and the interior of the T-connection 18, which functions to releasably hold the inner tube 30 and more particularly the outflow opening 48 in a location centrally within the second fluid outlet section 24. Additionally, the means for positioning 52 functions to releasably hold the inner tube 38 in a central position within the outer tube 30. The means for positioning 52 may include guides or tabs 54 for encircling the outflow opening 48 and/or the inner tube 38. The means for positioning 52 may be releasably attached to the inner tube 38 by sliding and surrounding engagement thereto. The plurality of tabs 54 may provide for limited flexibility of movement of the inner tube 38 and the outflow opening 48 for facilitation of the insertion or retraction of the elbow 46 into or from the interior of the T-connection 18.

The fluid-flow path from the T-connection 18 through the outer tube 30 for entry into the inner tube 38 is defined as the perpendicular fluid-flow course as represented by arrows 40 of FIG. 1.

The perpendicular fluid-flow course 40 extends between the interior surface of the outer tube 30 and the exterior surface of the inner tube 38 downwardly from the first fluid outlet section 22 to a position proximate to the closed penetrating end 36. The perpendicular fluid-flow course 40 is then turned upwardly proximate to the closed penetrating end 36 for fluid entry into the inflow end 42 of the inner tube 38. The perpendicular fluid-flow course 40 then ascends vertically toward the elbow 46. The perpendicular fluid-flow course 40 is then turned by the elbow 46 for exit from the outflow opening 48 and second fluid outlet section 24. The perpendicular fluid-flow course preferably facilitates the heating of the elongate probe 10 for thawing ground proximate to a frozen sewer or water line.

A longitudinal fluid-flow course 50 extends between the outlet connectors 14 through the fluid inlet section 20 traversing the elbow 46 for exit from the second fluid outlet section 24 into an inlet connector 12. The longitudinal fluid-flow course is depicted by arrows 50 in FIG. 1. The longitudinal fluid-flow course 50 is restricted by the placement of the elbow 46 within the interior of the T-connection 18. The restriction of the longitudinal fluid-flow course 50 facilitates the entry of fluid into the perpendicular fluid-flow course 40 for heating of the elongate probes 10.

In operation, holes are drilled into a frozen patch of ground surrounding a frozen sewer or water line or the elongate probes 10 are driven into the ground so that the elongate probes 10 are positioned within the ground a reasonable depth. Antifreeze solution is then pumped through the plurality of hose sections 16 for entry into the elongate probes 10 until the probes 10 and hose sections 16 are warmed, then hot water is pumped therethrough. Hot water conveyed into the T-connection 18 flows into the fluid inlet section 20 for passage through the outer tube 30, and entry into the inflow end 42 of the inner tube 38 establishing an adjacent downward and upward fluid-flow passage within the probe 10. The heated fluid may then exit the outflow opening 48 for entry into an adjacent hose section 16 for further entry into a subsequent elongate probe 10. The establishment of the perpendicular fluid-flow course 40 is enhanced by the restriction of the longitudinal fluid-flow course 50 which in turn may create venturi or pressure differential effects for facilitation of fluid entry into the inflow end 42. The partial blockage of the longitudinal fluid-flow course 50 restricts the fluid passage by at least as much as the restriction of fluid passage through the perpendicular fluid-flow course 40.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A probe for circulating heated water for thawing frozen ground, said probe comprising:
   (a) a T-connection having a fluid inlet section, a first fluid outlet section, and a second fluid outlet section; said T-connection comprising a longitudinal fluid-flow course extending between said fluid inlet section and said second fluid outlet section;
   (b) an elongate outer tube having an ingress port attached to said first fluid outlet section, said outer tube further having a closed penetrating end; and
   (c) an inner tube comprising an elbow positioned inside said said first fluid outlet section.

T-connection and said outer tube, said inner tube having an inflow end proximate to said penetrating end and an outflow opening positioned proximate to said second fluid outlet section.

2. The probe according to claim 1, further comprising a means for positioning engaged to said outflow opening and to said second fluid outlet section.

3. The probe according to claim 2, further comprising a second means for positioning engaged to said inner tube and to said outer tube.

4. The probe according to claim 1, said T-connection further comprising a perpendicular fluid-flow course extending between said fluid inlet section and said first fluid outlet section.

5. The probe according to claim 4, wherein said closed penetrating end is sealed with a plug.

6. The probe according to claim 4, wherein said perpendicular fluid-flow course depends from said fluid inlet section extending downward between said outer tube and said inner tube.

7. The probe according to claim 6, wherein said perpendicular fluid-flow course is turned upwardly proximate to said closed penetrating end for fluid entry into said inflow end of said inner tube.

8. The probe according to claim 7, wherein said perpendicular fluid-flow course extends upwardly within said inner tube from said inflow end to said elbow.

9. The probe according to claim 8, wherein said perpendicular fluid-flow course is turned by said elbow for exit from said outflow opening and said second fluid outlet section.

10. The probe according to claim 9, wherein said inner tube, said inflow end, said elbow, and said outflow opening have a dimensional size approximately equal to, but smaller than, said dimensional size of said T-connection and said outer tube.

11. The probe according to claim 4, wherein said longitudinal fluid-flow course is restricted by the position of said elbow within said T-connection.

12. A probe for circulating heated water for thawing frozen ground, said probe being a portion of a mobile heating system having a plurality of hose sections having inlet connectors and outlet connectors, said probe comprising:
   (a) a T-connection having a fluid inlet section, a first fluid outlet section, a second fluid outlet section, a longitudinal fluid-flow course extending between said fluid inlet section and said second fluid outlet section, and a perpendicular fluid-flow course extending between said fluid inlet section and said first fluid outlet section, said fluid inlet section being engaged to one of said outlet connectors of one of said hose sections .and said second fluid outlet section being engaged to said inlet connector of another of said hose sections;
   (b) an elongate outer tube having an ingress port attached to said first fluid outlet section, said outer tube further having a closed penetrating end; and
   (c) an inner tube positioned inside said T-connection and said outer tube, said inner tube having an inflow end proximate to said penetrating end and an elbow having an outflow opening, said elbow being positioned within said T-connection, and said outflow opening being positioned proximate to said second fluid outlet section.

13. The probe according to claim 12, further comprising a means for positioning engaged to said outflow opening and to said second fluid outlet section.

14. The probe according to claim 12, wherein said perpendicular fluid-flow course depends from said fluid inlet section extending downward between said outer tube and said inner tube.

15. The probe according to claim 14, wherein said perpendicular fluid-flow course is turned upwardly proximate to said closed penetrating end for fluid entry into said inflow end of said inner tube.

16. The probe according to claim 15, wherein said perpendicular fluid-flow course extends upwardly within said inner tube from said inflow end to said elbow.

17. The probe according to claim 16, wherein said perpendicular fluid-flow course is turned by said elbow for exit from said outflow opening and said second fluid outlet section.

18. The probe according to claim 17, wherein said longitudinal fluid-flow course is restricted by the position of said elbow within said T-connection.

* * * * *